W. FENSTERMACHER.
Side-Bar Wagon.

No. 203,021. Patented April 30, 1878.

WITNESSES:
Francis McArdle.
C. Sedgwick

INVENTOR:
W. Fenstermacher
BY Munn & Co.
ATTORNEYS.

UNITED STATES PATENT OFFICE.

WILLIAM FENSTERMACHER, OF SHIPPENSBURG, PENNSYLVANIA.

IMPROVEMENT IN SIDE-BAR WAGONS.

Specification forming part of Letters Patent No. 203,021, dated April 30, 1878; application filed March 25, 1878.

*To all whom it may concern:*

Figure 1:
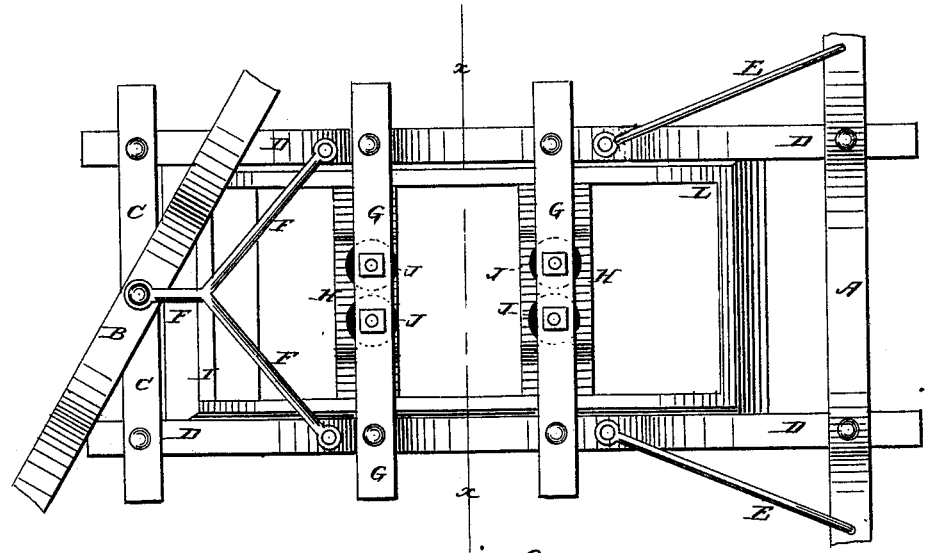
Figure 2:
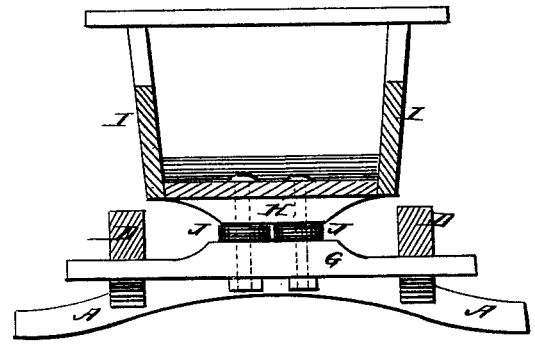

Be it known that I, WILLIAM FENSTERMACHER, of Shippensburg, in the county of Cumberland and State of Pennsylvania, have invented a new and useful Improvement in Side-Bar Wagons, of which the following is a specification:

In the accompanying drawings, forming part hereof, Figure 1 is an under-side view of the body and axles of a wagon to which my improvement has been applied; and Fig. 2 is a cross-section of the same, taken through the line $x\ x$, Fig. 1.

Similar letters of reference indicate corresponding parts.

The object of this invention is to furnish buggies and other wagons which shall be so constructed as to avoid the use of steel springs, and thus lessen the cost of construction and the liability of breakage, while furnishing wagons simple in construction, strong, durable, and convenient and comfortable in use.

A represents the rear axle, and B the forward axle, of a buggy or other wagon. C is the cross-bar, which is pivoted to the axle B by a king-bolt in the usual way. D are the side bars of a wagon, the rear ends of which are bolted to the axle A, and their forward ends are bolted to the ends of the cross-bar C.

The connection between the side bars D and the rear axle A is strengthened by the braces E, the rear ends of which are attached to the said axle A and their forward ends to the said side bars D, as shown in Fig. 1.

The forward parts of the side bars D are strengthened by the forked brace F, the ends of the branches of which are bolted to the said cross-bars D, and the forward end of which is secured in place by the king-bolt.

To the middle part of the side bars D are bolted or clipped the ends of two parallel cross-bars, G, the middle parts of which are made thicker, and are made flat upon their upper sides, and their end parts are thinned down to give them the necessary elasticity.

Upon the flattened upper side of the middle part of the bars G rests the flattened lower side of the middle part of the bars H, the end parts of which are thinned down to give them the necessary elasticity, and are bolted to the wagon-body I.

By this construction the combined elasticity of the side bars D and the cross-springs G and H will make a very easy-riding wagon.

The elasticity of the springs may be further assisted by rubber blocks J interposed between the flattened middle parts of the cross-springs G and H, as shown in Fig. 2, and secured in place by the bolts that secure the middle parts of said cross-springs to each other.

I am aware that it is not new to support the body of a vehicle by springs on the side bars; but by the arrangement of my springs G H J midway between the side bars and between the axles the spring is always from the center when an obstruction is encountered, and a minimum of jolt is thereby secured; hence

What I claim is—

In a side-bar vehicle, the body I, supported midway between the side bars and between the axles on the springs H J G, arranged substantially as shown and described.

WILLIAM FENSTERMACHER.

Witnesses:
  J. O. M. BUTTS,
  HENRY HIGH.